Aug. 1, 1933.  J. H. BARNES  1,920,836
CONE WINDING APPARATUS
Filed Aug. 4, 1931  3 Sheets-Sheet 1
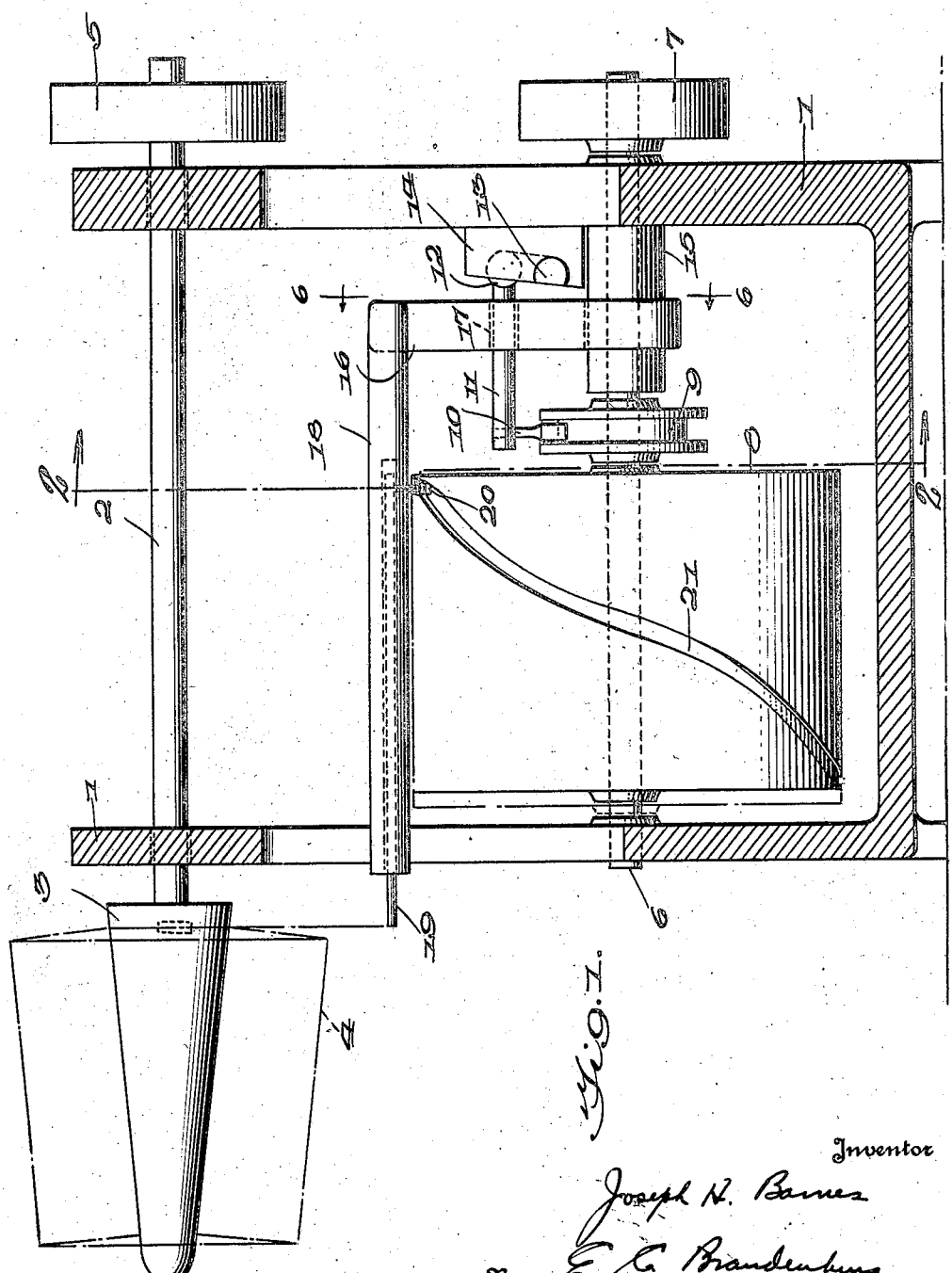

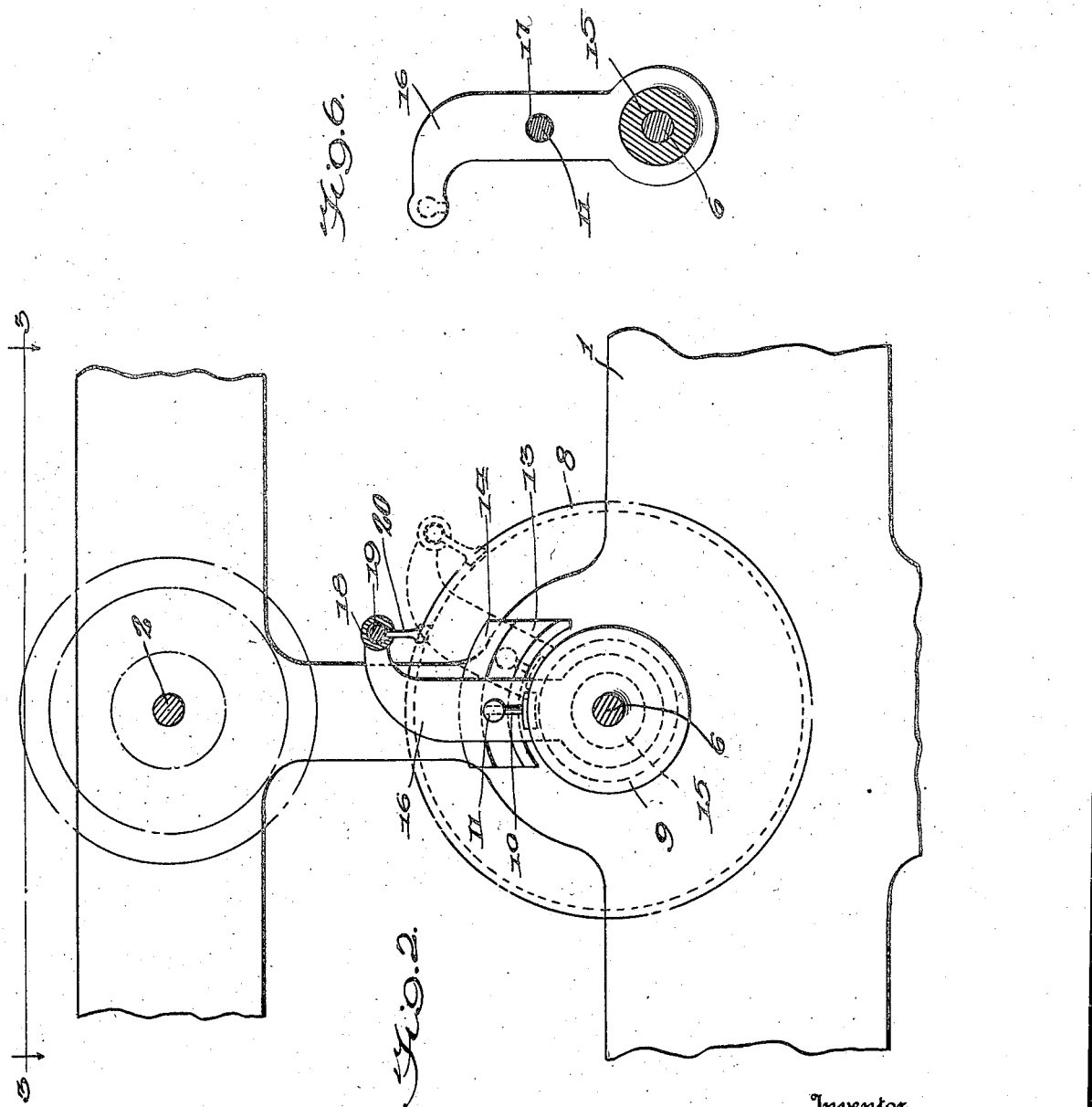

Aug. 1, 1933.   J. H. BARNES   1,920,836
CONE WINDING APPARATUS
Filed Aug. 4, 1931   3 Sheets-Sheet 3
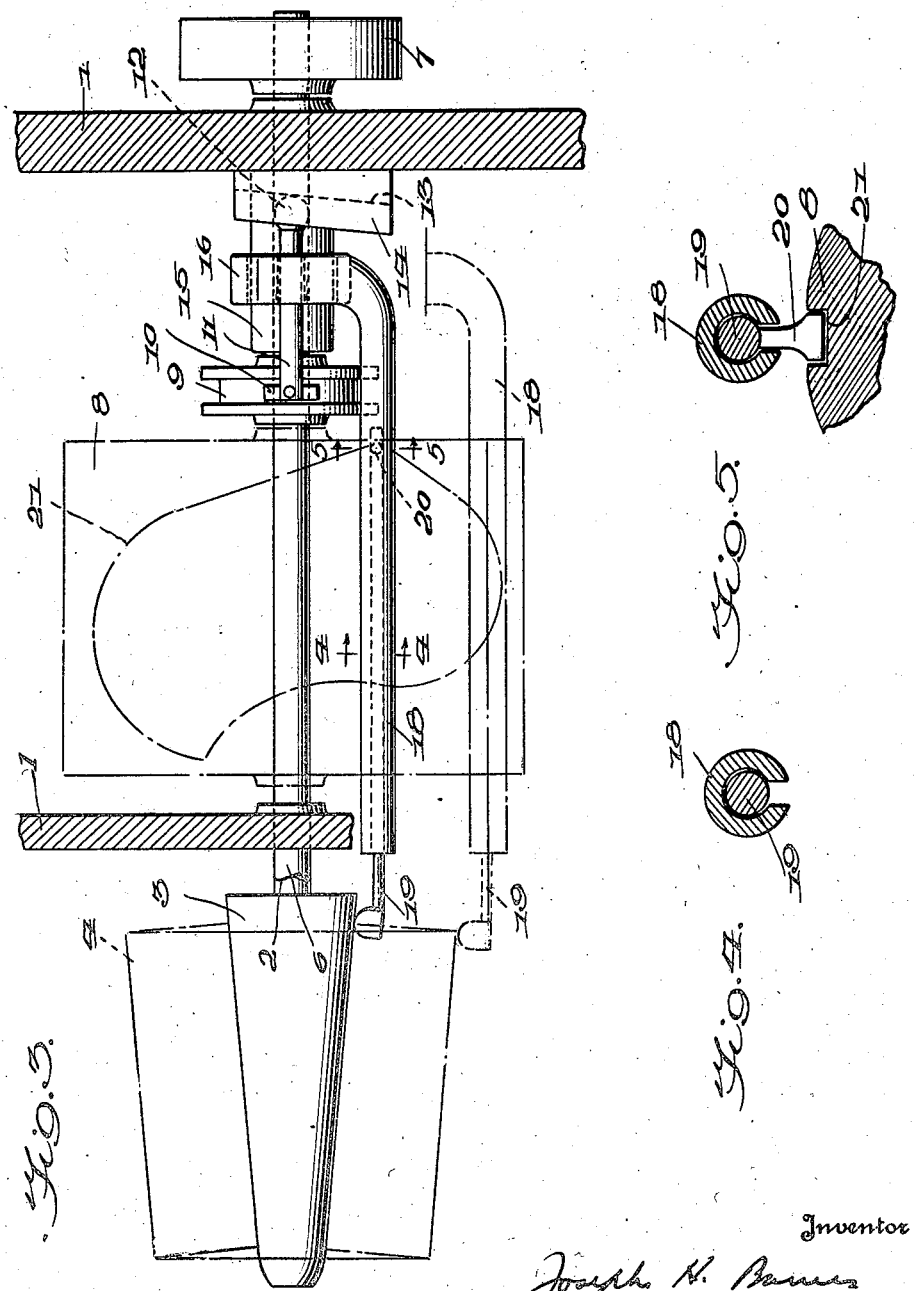

Patented Aug. 1, 1933                                                                      1,920,836

UNITED STATES PATENT OFFICE 1,920,836

CONE WINDING APPARATUS

Joseph H. Barnes, New Castle, Del., assignor of one-third to Delaware Rayon Company, New Castle, Del., and one-third to Leon H. Ryan, New Castle, Del.

Application August 4, 1931. Serial No. 555,107

14 Claims. (Cl. 242—43)

This invention relates to an improvement in cone winding apparatus, and is more particularly designed for use in forming tapered cones made of artificial or rayon thread.

The object of the invention is to produce an increased tapered cone of an improved type, allowing the thread when unwinding to be free from binding or catching on the base. The apparatus embodies means responsive to gradual increasing size of the cone for shifting the thread guide cam forwardly the distance of about one-quarter or three-eighths of an inch to gradually change the limits of the thread guide, and which therefore provides a cone with slightly tapered ends which will prevent the binding or catching of the thread on the base when unwinding.

In the accompanying drawings:

Fig. 1 is a partial elevation, partly in section, of my improved apparatus;

Fig. 2 is a sectional view thereof on line 2—2 of Fig. 1;

Fig. 3 is a partial sectional view at right angles to Fig. 1 and taken on the line 3—3 of Fig. 2;

Fig. 4 is a transverse sectional view on the line 4—4 of Fig 3;

Fig. 5 is a similar view on the line 5—5 of Fig. 3; and

Fig. 6 is a transverse sectional view, partly in side elevation, taken on the line 6—6 of Fig. 1.

The frame of the apparatus is designated generally by the numeral 1, and in which a shaft 2 is journaled for supporting a cone 3, and on which cone 3 the thread cone 4 is adapted to be formed. On the opposite end of the shaft 3, a pulley 5 is fixed for rotating the shaft.

A second shaft 6 is journaled in the frame 1 and carries a driving pulley 7 therefor, which is adapted to be driven in unison with the driving pulley 5. A cam 8 is slidably keyed to the shaft 6 to be turned thereby and to be moved longitudinally thereon by a collar 9, which is carried by the shaft 6.

A dog 10 engages the collar 9 and is carried by a rod 11, the opposite end of which has a ball 12 which slides in an arcuate groove 13 formed in a bracket 14 secured to the side of the frame 1.

A bushing 15 surrounds the shaft 6, on which bushing is journaled a lever 16. A hole 17 is formed through the lever, as shown in Figs. 1 and 6, and through which hole 17 the rod 11 extends. The upper end of the lever 16 carries a guide tube 18, in which a thread guide 19 is slidably mounted. A pin 20 depends from the thread guide 19 and rides in a cam groove 21 in the periphery of the cam 8, for causing reciprocating movement of the thread guide 19 lengthwise of the cone 3.

To obtain an increased tapered thread cone 4, the shafts 2 and 6 are rotated in unison. It is desirable to gradually shift the cam 8 forwardly a distance of about one-quarter to three-eighths of an inch, as the thread cone gradually increases in size. As the thread guide 19 rides on the surface of the gradually increasing tapered thread cone, this causes a swinging of the lever 16 on the bushing 15 from the full-line position of Fig. 2 to the dotted line position of Fig. 2.

This swinging movement carries the rod 11 around with it, and by reason of the engagement of the ball 12 attached to the rod 11 in the angular groove 13, this swinging movement of the lever 16 causes a longitudinal movement of the rod 11 and, with it, the collar 9 to gradually shift the position of the cam 8 from the full-line position in Fig. 1 to the dotted line position. This action gradually builds up a tapered thread cone in which the ends are parallel with each other but are tapered slightly with respect to the axis of the thread cone, as shown in Figs. 1 and 3. This form of cone allows the thread when unwinding to be free from binding or catching on the base.

I claim:

1. In an apparatus of the character described, the combination of a winding spindle, a thread guide reciprocable longitudinal of the winding spindle, means including cam means for reciprocating the thread guide, and means responsive to movement of the thread guide radially of the winding spindle for adjusting the position of the cam means.

2. In an apparatus of the character described, the combination of a winding spindle, a thread guide reciprocable longitudinal of the winding spindle, a cam for reciprocating the thread guide, and means responsive to movement of the thread guide radially of the winding spindle for adjusting the cam relative to the winding spindle.

3. In an apparatus of the character described, the combination of a winding spindle, a thread guide reciprocable longitudinal of the winding spindle, a cam for reciprocating the thread guide, and means responsive to movement of the thread guide radially of the winding spindle for adjusting the cam relative to the thread guide to vary the limits of reciprocation of the winding spindle.

4. In an apparatus of the character described, the combination of a cone, a thread guide reciprocable longitudinally relative to the cone, a pivoted support for the thread guide, a cam for causing reciprocating movement of the thread guide, and means cooperating with the pivoted support for adjusting the position of the cam.

5. In an apparatus of the character described, the combination of a winding cone, a thread guide reciprocable relative to the cone, a cam operatively connected with and for reciprocating the thread guide, a lever for supporting the thread guide and adapted to swing to vary the position of the thread guide, and means responsive to the swinging action of the lever for adjusting the position of the cam.

6. In an apparatus of the character described, the combination of a winding cone, a thread guide reciprocable relative to the cone, a cam for reciprocating the thread guide, a lever supporting the thread guide and adapted for swinging movement, a pin connected with the lever, and means causing longitudinal movement of the pin on swinging movement of the lever, and a collar connected with the pin for shifting the cam axially upon the swinging movement of the lever.

7. In an apparatus of the character described, the combination of a winding spindle, a thread guide reciprocable relative thereto, means including cam means for reciprocating the thread guide, the thread guide being adapted for lateral movement upon increase in the size of the thread cone, and means responsive to lateral movement of the thread guide for adjusting the cam means to vary the limits of the thread guide relative to the winding spindle.

8. In an apparatus of the character described, the combination of a winding spindle, a reciprocable thread guide associated therewith, means including cam means for reciprocating the thread guide, means for supporting the thread guide for lateral swinging movement, and means responsive to the lateral swinging movement of the thread guide for adjusting the cam means to vary the reciprocating movements of the thread guide relative to the winding spindle.

9. In an apparatus of the character described, the combination of a winding spindle, a reciprocable thread guide associated therewith, means including cam means for reciprocating the thread guide, a swinging support for the thread guide, and means responsive to the swinging action of the support for adjusting the cam means to vary the limits of the reciprocating movement of the thread guide.

10. In an apparatus of the character described, the combination of a winding cone, a reciprocable thread guide associated therewith, means including cam means for reciprocating the thread guide, a pivoted support for the thread guide for causing lateral movement thereof upon an increase in the size of the thread cone, and means connected with the pivoted support and responsive to swinging movement thereof for adjusting the cam means to vary the limits of the reciprocating movement of the thread guide.

11. In an apparatus of the character described, the combination with a winding mandrel, of a thread guide to traverse the thread on the mandrel, a cam to traverse the guide, said cam being mounted for longitudinal movement to cause the traverse of the yarn to be continuously advanced in one direction longitudinally of the mandrel, means for supporting the thread guide for swinging movement radially of the mandrel upon building up of the thread thereon, and means responsive to said swinging movement of the guide for causing longitudinal movement of the cam.

12. In an apparatus of the character described, the combination with a winding mandrel, of a thread guide to traverse the thread on the mandrel, a cam to traverse the thread guide, said cam being mounted for longitudinal sliding movement to cause the traverse of the yarn to be continuously advanced in one direction longitudinally of the mandrel, a support for the thread guide pivoted coaxially of the cam for swinging movement upon building up of the thread on the mandrel, and means responsive to said swinging movement of the support for causing longitudinal shifting movement of the cam.

13. In an apparatus of the character described, the combination with a winding mandrel, of a thread guide to traverse the thread on the mandrel, a cam to traverse the thread guide, said cam being mounted for longitudinal sliding movement to cause the traverse of the yarn to be continuously advanced in one direction longitudinally of the mandrel, a support for the thread guide pivoted coaxially of the cam for swinging movement upon building up of the thread on the mandrel, shifting means longitudinally slidable relative to said support and connected with the cam for causing longitudinal shifting movement of the cam, and means causing longitudinal movement of said shifting means upon swinging movement of the guide support.

14. In an apparatus of the character described, the combination with a winding mandrel, of a thread guide to traverse the thread on the mandrel, a cam to traverse the thread guide, said cam being mounted for longitudinal sliding movement to cause the traverse of the thread to be continuously advanced in one direction longitudinally of the mandrel, a support for the thread guide pivoted coaxially of the cam for swinging movement upon building up of the thread on the mandrel, a rod carried by said support and longitudinally slidable therethrough for causing longitudinal shifting movement of the cam, and a stationary cam arranged in position to move the rod longitudinally upon swinging movement of the support for the thread guide.

JOSEPH H. BARNES.